United States Patent
Hashimoto (10) Patent No.: US 10,864,587 B2
(45) Date of Patent: Dec. 15, 2020

(54) WIRE ELECTRICAL DISCHARGE MACHINE AND CONTROL METHOD FOR WIRE ELECTRICAL DISCHARGE MACHINE

(71) Applicant: FANUC CORPORATION, Yamanashi (JP)

(72) Inventor: Taiju Hashimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 378 days.

(21) Appl. No.: 15/910,066

(22) Filed: Mar. 2, 2018

(65) Prior Publication Data

US 2018/0250761 A1  Sep. 6, 2018

(30) Foreign Application Priority Data

Mar. 3, 2017 (JP) .................................. 2017-040069

(51) Int. Cl.
*B23H 7/00* (2006.01)
*B23H 9/00* (2006.01)
(Continued)

(52) U.S. Cl.
CPC ............... *B23H 7/08* (2013.01); *B23H 7/065* (2013.01); *G05B 19/401* (2013.01);
(Continued)

(58) Field of Classification Search
CPC . B23H 7/04; B23H 7/06; B23H 7/065; B23H 7/08; B23H 7/20; B23H 2500/20;
(Continued)

(56) References Cited

U.S. PATENT DOCUMENTS 5,558,784 A  9/1996 Obrist
2005/0143861 A1* 6/2005 Watanabe ............. B25J 9/1684
700/264
(Continued)

FOREIGN PATENT DOCUMENTS

CN  201009025 Y  1/2008
CN  103240471 A  8/2013
(Continued)

OTHER PUBLICATIONS

English Abstract and Machine Translation for Chinese Publication No. 103521863 A, published Jan. 22, 2014, 7 pgs.
(Continued)

*Primary Examiner* — Hung D Nguyen
(74) *Attorney, Agent, or Firm* — Fredrikson & Byron, P.A.

(57) ABSTRACT

A wire electrical discharge machine machines a workpiece so as to have different machined shapes on a top surface and a bottom surface of the workpiece. The wire electrical discharge machine includes: a distance measuring sensor for moving within a machining area of the wire electrical discharge machine and measuring a distance between the distance measuring sensor and an object to be measured; and a vertical position calculating unit for calculating a distance between a reference surface and the top surface and a distance between the reference surface and the bottom surface, from a distance between the reference surface and the distance measuring sensor, a distance between the top surface and the distance measuring sensor, and a distance between the bottom surface and the distance measuring sensor, measured by the distance measuring sensor.

9 Claims, 7 Drawing Sheets

(51) Int. Cl.
*B23H 7/08* (2006.01)
*G05B 19/404* (2006.01)
*B23H 7/06* (2006.01)
*G05B 19/401* (2006.01)

(52) U.S. Cl.
CPC ........ *G05B 19/404* (2013.01); *B23H 2500/20* (2013.01); *G05B 2219/45043* (2013.01)

(58) Field of Classification Search
CPC .. G05B 19/401; G05B 19/402; G05B 19/404; G05B 19/4065; G05B 19/4083; G05B 19/4086; G05B 19/41; G05B 19/425; G05B 2219/33263; G05B 2219/37398; G05B 2219/45043; G05B 2219/45057; G05B 2219/45112; G05B 2219/45165; G05B 2219/45221; G05B 2219/45236; G05B 2219/49062; G05B 2219/49094; G05B 2219/49173; G05B 2219/50053; G05B 2219/50056; G05B 2219/50067
USPC .......... 219/69.11, 69.12, 69.15, 69.17, 69.19
See application file for complete search history.

(56) References Cited

U.S. PATENT DOCUMENTS

| | | | | |
|---|---|---|---|---|
| 2006/0102596 | A1* | 5/2006 | Kinoshita | B23H 7/04 219/69.12 |
| 2006/0219667 | A1* | 10/2006 | Martin | B23H 7/065 219/69.12 |
| 2008/0047936 | A1* | 2/2008 | Hayashi | B23H 7/065 219/69.12 |
| 2012/0223055 | A1 | 9/2012 | Kawahara et al. | |
| 2012/0312786 | A1* | 12/2012 | Arakawa | G05B 19/4086 219/69.11 |
| 2013/0211577 | A1* | 8/2013 | Yamane | B23H 1/02 700/186 |
| 2015/0248125 | A1 | 9/2015 | Kanazawa et al. | |

FOREIGN PATENT DOCUMENTS

| | | |
|---|---|---|
| CN | 103521863 A | 1/2014 |
| CN | 104756027 A | 7/2015 |
| CN | 105312695 A | 2/2016 |
| JP | 5212621 A | 8/1993 |
| JP | 2007245342 A | 9/2007 |
| JP | 2011235400 A | 11/2011 |
| JP | 201467158 A | 4/2014 |
| JP | 2016070691 A | 5/2016 |

OTHER PUBLICATIONS

English Abstract and Machine Translation for Chinese Publication No. 201009025 Y, published Jan. 23, 2008, 6 pgs.
English Abstract and Machine Translation for Japanese Publication No. 2016-070691 A, published May 9, 2016, 13 pgs.
English Abstract and Machine Translation for Chinese Publication No. 104756027 A, published Jul. 1, 2015, 33 pgs.
English Abstract for Japanese Publication No. 2014067158 A, published Apr. 17, 2014, 1 pg.
English Abstract and Machine Translation for Japanese Publication No. 2011-235400 A, published Nov. 24, 2011, 13 pgs.
English Abstract and Machine Translation for Japanese Publication No. 2007-245342 A, published Sep. 27, 2007, 18 pgs.
English Abstract and Machine Translation for Japanese Publication No. 05-212621 A, published Aug. 24, 1993, 6 pgs.
Extended European Search Report dated Aug. 3, 2018 for related EP Application No. 18159176.9, 8 pgs.
English Abstract and Machine Translation for Chinese Publication No. 105312695 A, published Feb. 10, 2016, 24 pgs.
English Abstract and Machine Translation for Chinese Publication No. 103240471 A, published Aug. 14, 2013, 22 pgs.

\* cited by examiner

WIRE ELECTRICAL DISCHARGE MACHINE AND CONTROL METHOD FOR WIRE ELECTRICAL DISCHARGE MACHINE

CROSS-REFERENCE TO RELATED APPLICATION

This application is based upon and claims the benefit of priority from Japanese Patent Application No. 2017-040069 filed on Mar. 3, 2017, the contents of which are incorporated herein by reference.

BACKGROUND OF THE INVENTION

Field of the Invention

The present invention relates to a wire electrical discharge machine and a control method for the wire electrical discharge machine.

Description of the Related Art

Japanese Laid-Open Patent Publication No. 2014-067158 discloses a configuration in which in order to determine the inclination of a cantilevered workpiece due to its own weight, a distance measuring sensor attached to an arm of a processing machine is used to measure the distance between the processing machine and the workpiece at multiple points.

SUMMARY OF THE INVENTION

When a wire electrical discharge machine machines a target object (workpiece) such that the top and bottom surfaces thereof have different shapes from each other, it is necessary to accurately determine the vertical positions of the top and bottom surfaces thereof. However, even with applying the technique of Japanese Laid-Open Patent Publication No. 2014-067158 to the wire electrical discharge machine, it is impossible to determine the vertical positions of the top and bottom surfaces thereof.

The present invention has been devised to solve the above problem, it is therefore an object of the present invention to provide a wire electrical discharge machine capable of obtaining the vertical positions of the top and bottom surfaces of a workpiece as well as providing a control method for the wire electrical discharge machine.

According to a first aspect of the present invention, a wire electrical discharge machine configured to machine a workpiece so as to have different machined shapes on a top surface and a bottom surface of the workpiece, includes: a distance measuring sensor configured to move within a machining area of the wire electrical discharge machine and measure a distance from the distance measuring sensor to an object to be measured; and a calculating unit configured to set a reference surface in the machining area, and calculate a distance between the reference surface and the top surface and a distance between the reference surface and the bottom surface, from a distance between the reference surface and a distance measuring sensor, measured by the distance measuring sensor, a distance between the top surface and the distance measuring sensor, measured from above the workpiece by the distance measuring sensor, and a distance between the bottom surface and the distance measuring sensor, measured from below the workpiece by the distance measuring sensor.

According to a second aspect of the present invention, there is provided a control method for a wire electrical discharge machine configured to machine a workpiece so as to have different machined shapes on a top surface and a bottom surface of the workpiece, including: a distance measuring step of moving a distance measuring sensor within a machining area of the wire electrical discharge machine and measuring, with the distance measuring sensor, a distance from the distance measuring sensor to an object to be measured; and a calculating step of setting a reference surface in the machining area and calculating a distance between the reference surface and the top surface and a distance between the reference surface and the bottom surface, from a distance between the reference surface and the distance measuring sensor, measured by the distance measuring sensor, a distance between the top surface and the distance measuring sensor, measured from above the workpiece by the distance measuring sensor, and a distance between the bottom surface and the distance measuring sensor, measured from below the workpiece by the distance measuring sensor.

According to the present invention, it is possible to determine the vertical positions of the top and bottom surfaces of the workpiece.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, the present invention will be described by detailing embodiments. The following embodiments do not limit the invention according to the claims. Not all combinations of features described in the embodiments are necessarily essential to the means for solving the problems of the invention.

[Configuration of Wire Electrical Discharge Machine]

Figure 1:
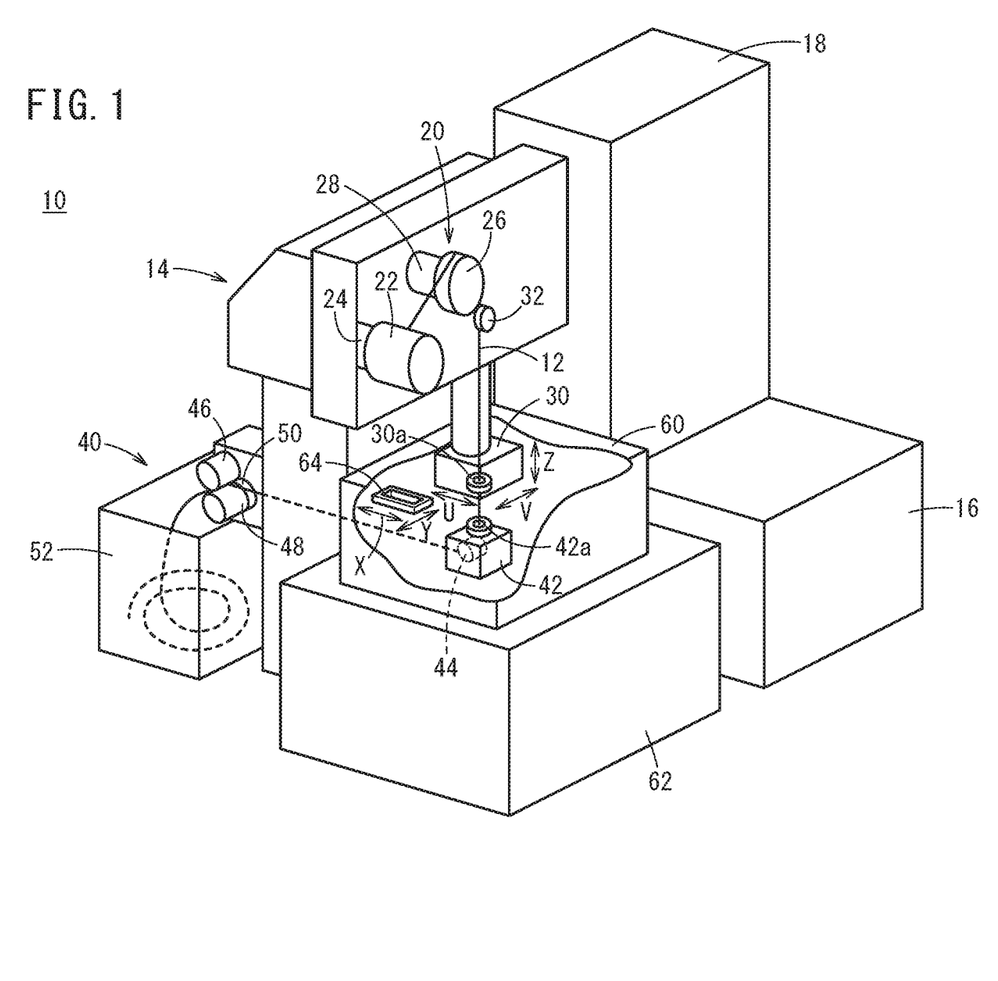
FIG. 1 is a diagram schematically showing the overall configuration of a wire electrical discharge machine.

FIG. 1 is a diagram schematically showing the overall configuration of a wire electrical discharge machine 10. The wire electrical discharge machine 10 applies voltage across an electrode gap (clearance) formed between a wire electrode 12 and a workpiece W (FIG. 2) to generate electrical discharge, thereby performing electrical discharge machining on the workpiece W. The wire electrode 12 is formed of, for example, tungsten-based, copper alloy-based, brass-based metal or the like. On the other hand, the material of the workpiece W is, for example, a metal material such as an iron-based material or a superhard material (e.g., tungsten carbide).

The wire electrical discharge machine 10 includes a machine main body 14, a dielectric fluid unit 16 and a numerical controller 18. The machine main body 14 includes a feed path 20 for feeding the wire electrode 12 toward the workpiece W and a collecting path 40 for collecting the wire electrode 12 having passed through the workpiece W.

The feed path 20 includes a wire bobbin 22 on which the wire electrode 12 is wound, a torque motor 24 for applying torque to the wire bobbin 22, a brake roller 26 for applying a braking force by friction to the wire electrode 12, a brake motor 28 for applying brake torque to the brake roller 26 and an upper wire guide (wire electrode driving unit) 30 for guiding the wire electrode 12 above the workpiece W. A tension detector 32 is provided between the brake motor 28 and the upper wire guide 30. The tension detector 32 is a sensor for detecting the tension of the wire electrode 12.

The collecting path 40 includes a lower wire guide 42 for guiding the wire electrode 12 below the workpiece W, a lower guide roller 44 provided in the lower wire guide 42, a pinch roller 46 and a feed roller 48 for pinching the wire electrode 12 therebetween, a torque motor 50 for applying torque to the feed roller 48 and a wire collecting box 52 for collecting the wire electrode 12.

The machine main body 14 includes a work-pan 60 capable of storing a dielectric working fluid such as deionized water or oil used for electrical discharge machining. The upper wire guide 30 and the lower wire guide 42 are installed in the work-pan 60. The work-pan 60 is placed on a base portion 62.

A worktable 64, on which the workpiece W is placed, is disposed in the work-pan 60. The worktable 64 is provided so as to be movable on the horizontal plane in the X-axis direction and the Y-axis direction orthogonal to the X-axis by servomotors (not shown). The worktable 64 is arranged between the upper wire guide 30 and the lower wire guide 42.

Figure 2:
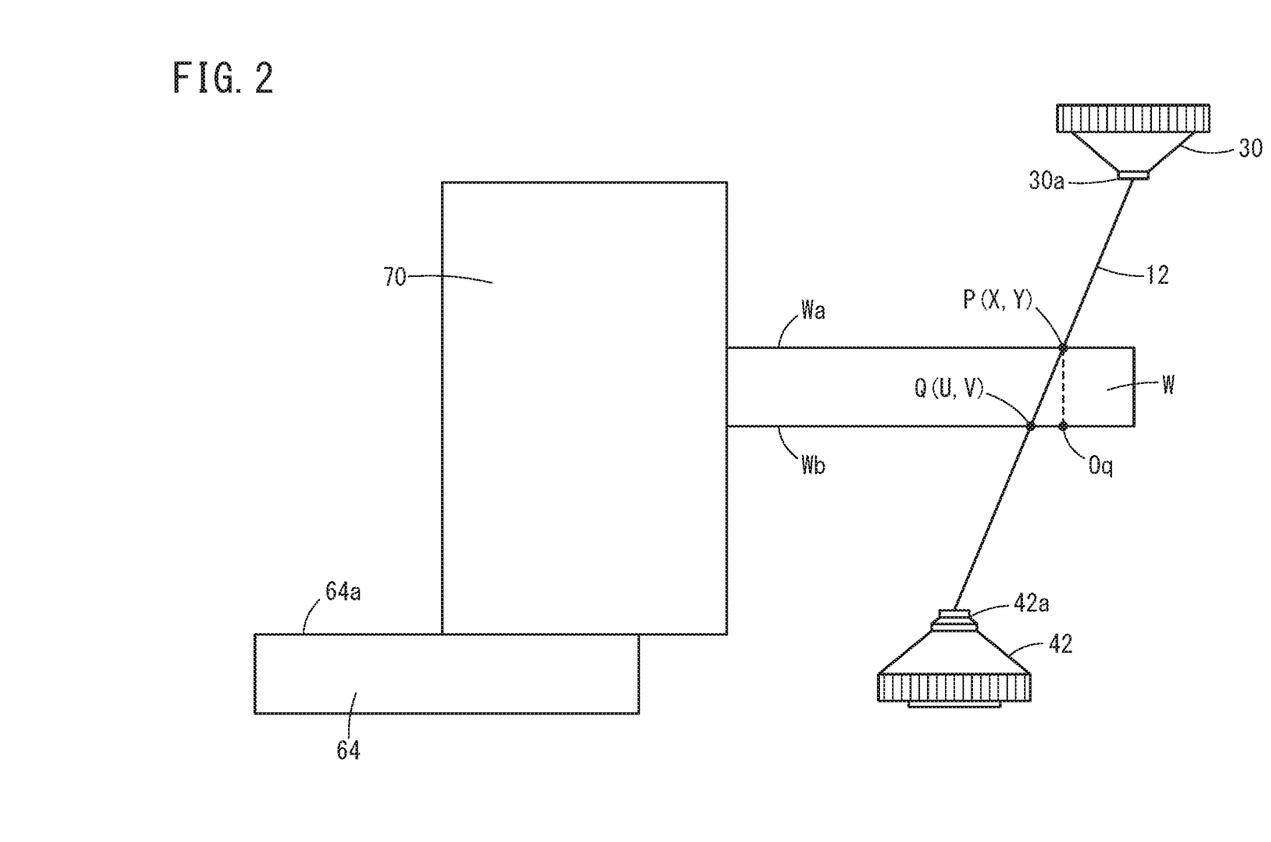
FIG. 2 is a schematic diagram showing a state in which a workpiece is machined so as to have different shapes on the top and bottom.

The upper wire guide 30 and the lower wire guide 42 respectively have an upper die guide 30a and a lower die guide 42a for supporting the wire electrode 12. The upper wire guide 30 can move in a U-axis direction parallel to the X-axis, a V-axis direction parallel to the Y-axis and a Z-axis direction orthogonal to the X-axis and the Y-axis by unillustrated servomotors. This enables the machine main body 14 to perform a top-and-bottom different figure machining, or machine the workpiece W so as to have different shapes on top and bottom surfaces Wa and Wb, as shown in FIG. 2.

The upper wire guide 30 and the lower wire guide 42 eject a clean dielectric working fluid not containing sludge (machined chips). This makes it possible to fill the clearance (electrode gap) between the wire electrode 12 and the workpiece W with the clean working fluid suitable for electrical discharge machining, so that it is possible to prevent deterioration of the accuracy of the electrical discharge machining caused by the sludge generated during electrical discharge machining. Electric discharge machining is performed while the workpiece W is immersed in the working fluid stored in the work-pan 60.

The dielectric fluid unit 16 is a device for removing the sludge contained in the working fluid inside the work-pan 60, controlling the electric resistivity and the temperature of the working fluid and managing the quality of the working fluid. The working fluid is quality controlled by this dielectric fluid unit 16 and returned to the work-pan 60 again. The numerical controller 18 controls the machine main body 14 according to an NC program. The configuration of the numerical controller 18 will be detailed later.

[Top-and-Bottom Different Figure Machining]

FIG. 2 is a schematic view showing a state in which a workpiece W is machined so as to have different shapes on the top and bottom. The workpiece W shown in FIG. 2 is a protruding portion projecting from a main part 70 thereof. The main part 70 is fixed to the worktable 64 by an unillustrated jig.

The position of the workpiece W to be machined by the wire electrode 12 is specified by an NC program prepared in advance by CAM or the like. In the NC program, a machining position P on a top surface Wa of the workpiece W is defined by coordinate values (X, Y) on the XY-coordinate system and a machining position Q on a bottom surface Wb is defined by coordinate values (U, V) on the UV-coordinate system. The XY-coordinate system is an absolute coordinate system with its origin fixed, whereas the UV-coordinate system is a relative coordinate system with its origin set at the machining position P. In other words, the UV-coordinate system has an origin Oq at which the vertical line extending downward from the machining position P intersects the bottom surface Wb. Thus, the machining position Q is defined relatively to the machining position P, so that it is possible to perform a top-and-bottom different figure machining, or machine the workpiece so as to have different machined shapes on the top and bottom surfaces Wa and Wb.

If the coordinate values (X, Y) on the XY-coordinate system and the coordinate values (U, V) on the UV-coordinate system take the same values, the machine main body 14 is controlled such that tilt of the wire electrode 12 relative to the thickness direction of the workpiece W is set to be smaller as the thickness of the workpiece W becomes thicker.

[Measurement of Vertical Positions of Top Surface and Bottom Surface of Workpiece]

Figure 3:
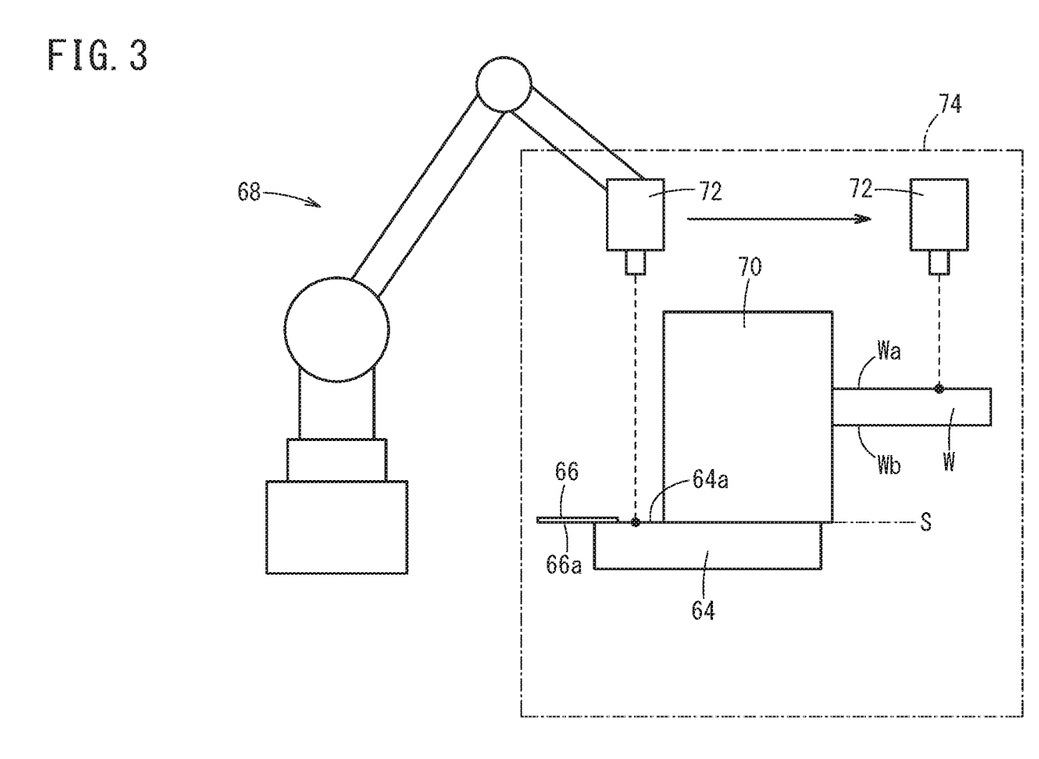
FIG. 3 is a diagram for explaining a method of determining the position of the top surface of a workpiece with respect to the vertical direction.
Figure 4:
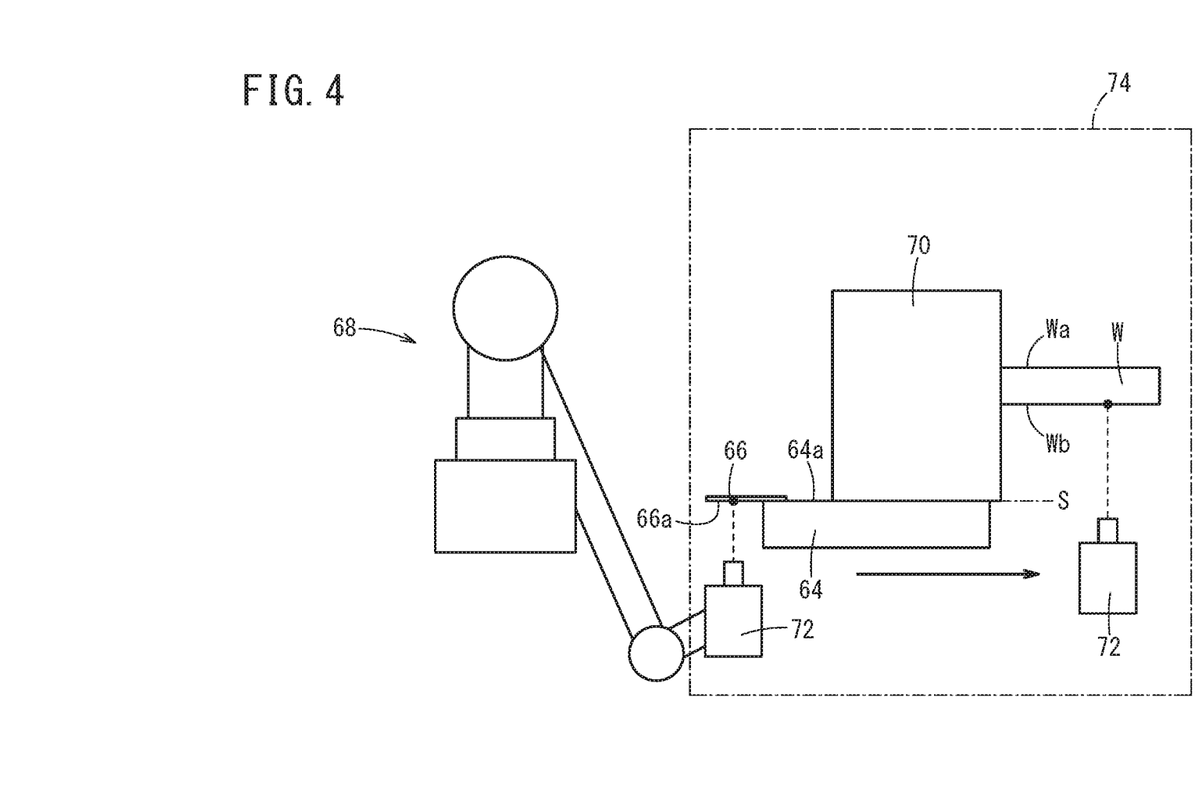
FIG. 4 is a diagram for explaining a method of determining the position of the bottom surface of a workpiece with respect to the vertical direction.

In the case of machining the workpiece W so as to have different machined shapes on the top and bottom, it is necessary to accurately determine the vertical positions of the top and bottom surfaces Wa and Wb of the workpiece W and input them to the numerical controller 18. FIG. 3 is a diagram for explaining a method of determining the vertical position of the top surface Wa of the workpiece W. FIG. 4 is a diagram for explaining a method of determining the vertical position of the bottom surface Wb of the workpiece W. The vertical positions of the top and bottom surfaces Wa and Wb of the workpiece W are obtained from the measurements of a distance measuring sensor 72. The distance measuring sensor 72 measures the distance between the distance measuring sensor 72 and an object to be measured by using an infrared laser or the like. The distance measuring sensor 72 is attached as an end effector of a robot 68 so as to move inside a machining area 74 of the machine main body 14.

The vertical positions of the top and bottom surfaces Wa and Wb of the workpiece W are each obtained as a vertical distance from a reference surface S. The reference surface S is set on an upper surface 64a of the worktable 64. Hereinafter, the vertical distance of the top surface Wa of the workpiece W from the reference surface S may be simply referred to as the position of the top surface Wa, and the vertical distance of the bottom surface Wb of the workpiece W from the reference surface S may be simply referred to as the position of the bottom surface Wb.

An extending member (bottom side reference surface member) 66 that protrudes from the upper surface 64a of the worktable 64 is fixed to the upper surface 64a of the worktable 64. A lower surface 66a of the extending member 66 is flush with the upper surface 64a (reference surface S) of the worktable 64.

In order to determine the position of the top surface Wa of the workpiece W, the distance measuring sensor 72 is moved by the robot 68 above the worktable 64, to measure the vertical distance from the distance measuring sensor 72 to the upper surface 64a of the worktable 64. Next, the distance measuring sensor 72 is translated (moved on a plane parallel to the XY-plane) above the top surface Wa of the workpiece W by the robot 68 to measure the vertical distance from the distance measuring sensor 72 to the top surface Wa of the workpiece W. Then, a difference between the vertical distance from the distance measuring sensor 72 to the upper surface 64a of the worktable 64 and the vertical distance from the distance measuring sensor 72 to the top surface Wa of the workpiece W is taken to thereby determine the vertical distance of the top surface Wa of the workpiece W from the reference surface S.

When measuring the position of the bottom surface Wb of the workpiece W, the distance measuring sensor 72 is moved by the robot 68 to the lower side of the extending member 66, to measure the vertical distance from the distance measuring sensor 72 to the lower surface 66a of the extending member 66. Next, the robot 68 moves the distance measuring sensor 72 in parallel to the lower side of the bottom surface Wb of the workpiece W to measure the vertical distance from the distance measuring sensor 72 to the bottom surface Wb of the workpiece W. Then, a difference between the vertical distance from the distance measuring sensor 72 to the lower surface 66a of the extending member 66 and the vertical distance from the distance measuring sensor 72 to the bottom surface Wb of the workpiece W is taken to thereby determine the vertical distance of the bottom surface Wb of the workpiece W from the reference surface S.

[Configuration of Numerical Controller]

Figure 5:
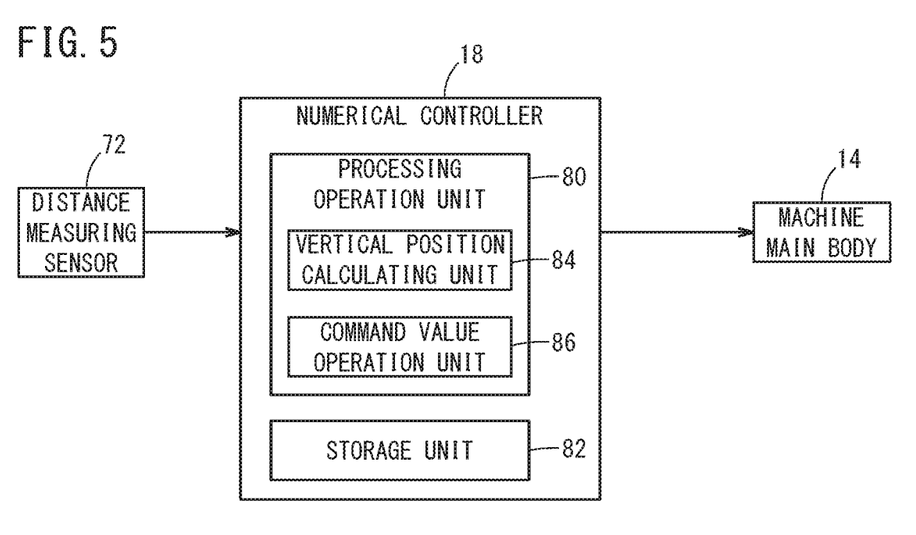
FIG. 5 is a block diagram showing the configuration of a numerical controller.

FIG. 5 is a block diagram showing a configuration of the numerical controller 18. The numerical controller 18 has a processing operation unit 80 and a storage unit 82. The processing operation unit 80 includes a processor, a memory, etc., and performs various kinds of processing, operations and the like. The storage unit 82 stores an NC program and the like generated by CAM or the like, the NC program being executed to cause the machine main body 14 to machine the workpiece W into a desired shape.

The processing operation unit 80 includes a vertical position calculating unit 84 and a command value operation unit (control unit) 86. The vertical position calculating unit 84 calculates the position of the top surface Wa, the position of the bottom surface Wb, and the thickness of the workpiece W based on the measurements input from the distance measuring sensor 72. The command value operation unit 86 executes the NC program stored in the storage unit 82 and calculates command values for controlling the machine main body 14.

[Control Flow]

Figure 6:
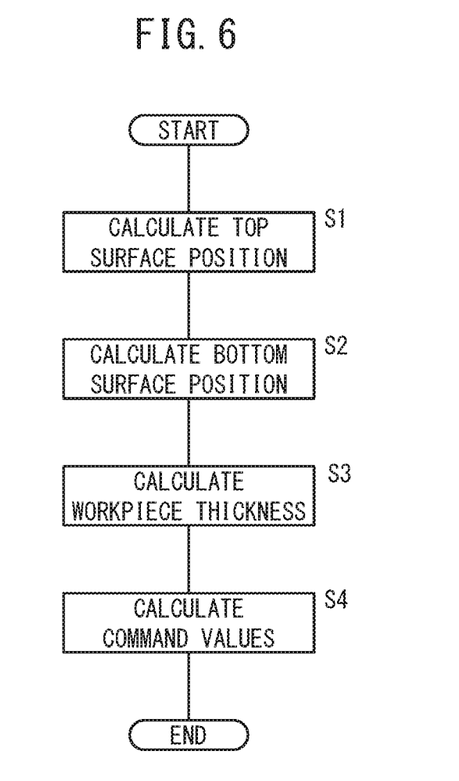
FIG. 6 is a flowchart showing a processing flow performed in a processing operation unit of the numerical controller.

FIG. 6 is a flowchart showing the flow of processing performed in the processing operation unit 80 of the numerical controller 18.

At step S1, the vertical position calculating unit 84 takes a difference between the vertical distance from the distance measuring sensor 72 to the upper surface 64a of the worktable 64 and the vertical distance from the distance measuring sensor 72 to the top surface Wa of the workpiece W, which are measured by the distance measuring sensor 72, to thereby calculate the vertical distance of the top surface Wa of the workpiece W from the reference surface S. Then, the control goes to step S2.

At step S2, the vertical position calculating unit 84 takes a difference between the vertical distance from the distance measuring sensor 72 to the lower surface 66a of the extending member 66 and the vertical distance from the distance measuring sensor 72 to the bottom surface Wb of the workpiece W, which are measured by the distance measuring sensor 72, to thereby calculate the vertical distance of the bottom surface Wb of the workpiece W from the reference surface S. Then, the control goes to step S3.

At step S3, the vertical position calculating unit 84 takes a difference between the vertical distance of the top surface Wa of the workpiece W from the reference surface S and the vertical distance of the bottom surface Wb of the workpiece W from the reference surface S to thereby calculate the thickness of the workpiece W. Then, the control proceeds to step S4.

At step S4, the command value operation unit 86, based on the calculated vertical distance of the top surface Wa of the workpiece W from the reference surface S, the vertical distance of the bottom surface Wb of the workpiece W from the reference surface S, the thickness of the workpiece W and the NC program, computes the command values for the servomotors (not shown) configured to drive the worktable 64 and the command values for the servomotors (not shown) configured to drive the upper wire guide 30, and the control is terminated.

[Operation and Effect]

In the case of machining the workpiece W so as to have different machined shapes on the top and bottom, it is necessary to accurately determine the vertical positions of the top and bottom surfaces Wa and Wb of the workpiece W and set them in the numerical controller 18 that executes the NC program. If erroneous positions are set in the numerical controller 18 as the positions of the top and bottom surfaces Wa and Wb of the workpiece W, it is impossible to secure the machining accuracy of the workpiece W.

Figure 7:
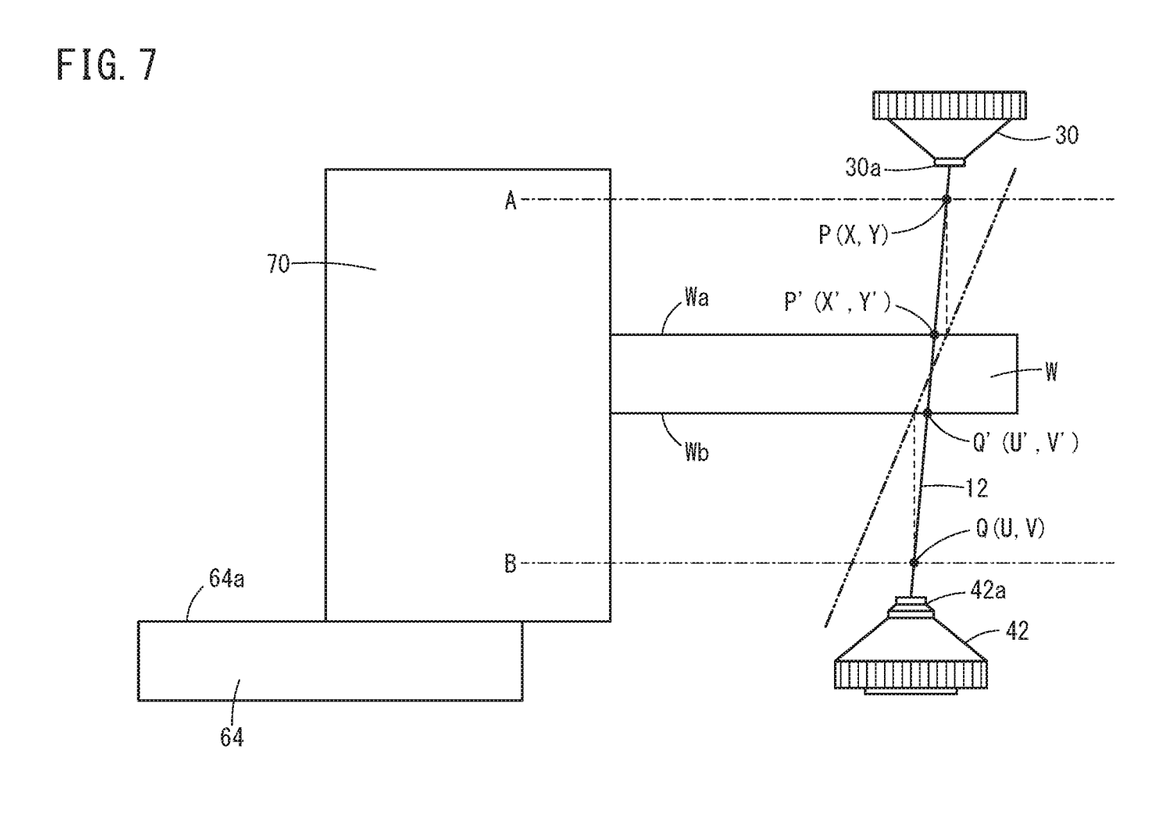
FIG. 7 is a schematic diagram showing a state in which a workpiece is machined so as to have different shapes on the top and bottom.

FIG. 7 is a schematic diagram showing a state in which the workpiece W is machined so as to have different shapes on the top and bottom. In this example, it is assumed that, in the numerical controller 18, the position of the top surface Wa of the workpiece W is set at a position A that is higher than the top surface Wa and the position of the bottom surface Wb of the workpiece W is set at a position B lower than the bottom surface Wb.

In this case, the numerical controller 18 calculates the command values for machining the top of the workpiece W on the assumption that a machining position P(X, Y) on the top surface Wa of the workpiece W specified by the NC program is located on a plane defined by the position A, and further calculates the command values for machining the bottom of the workpiece W on the assumption that a machining position Q(U, V) on the bottom surface Wb of the workpiece W specified by the NC program is located on a plane defined by the position B. As a result, the top surface Wa of the workpiece W is machined actually at P'(X', Y') and the bottom surface Wb is machined actually at Q'(U', V'). That is, the workpiece W ends up being machined at positions different from those specified by the NC program.

Conventionally, the operator had to measure the position of the top surface Wa and the position of the bottom surface Wb of the workpiece W by using an indicator or the like and set the measurement results in the numerical controller 18. However, such a measurement procedure is burdensome, and mistake in measurement or input error of the measurement values to the numerical controller 18 often occurs. As a result, in some cases the position of the top surface Wa and the position of the bottom surface Wb of the workpiece W could not be correctly set to the numerical controller 18.

To deal with this, in the present embodiment, the numerical controller 18 is configured to calculate the positions of the top and bottom surfaces Wa and Wb of the workpiece W, based on the vertical distance of the distance measuring sensor 72 to the reference surface S, the vertical distance of the distance measuring sensor 72 to the top surface Wa of the workpiece W and the vertical distance of the distance measuring sensor 72 to the bottom surface Wb of the workpiece W, which are measured by the distance measuring sensor 72.

Since the measurement by the distance measuring sensor 72 is automatically performed so as to enable the numerical controller 18 to calculate the positions of the top and bottom surfaces Wa and Wb of the workpiece W, it is possible to set the exact positions of the top and bottom surfaces Wa and Wb of the workpiece W to the numerical controller 18 while reducing the operator's workload. As a result, it is possible to enhance the machining accuracy of the workpiece W.

Other Embodiments

Although the present invention has been described with reference to the embodiment, the technical scope of the present invention is not limited to that described in the above embodiment. It goes without saying that various modifications or improvements can be added to the above embodiment. It is obvious from the description of the scope of the claims that modes added with such modifications and/or improvements can be included in the technical scope of the present invention.

For example, in the above embodiment, the lower surface 66a of the extending member 66 is used as the reference surface S. However, the bottom surface of the main part 70 overhanging from the worktable 64 may be used as the reference surface S.

Further, though in the above embodiment, the upper surface 64a of the worktable 64 is used as the reference surface S, the lower surface of the worktable 64 may be used as the reference surface S. When the thickness of the worktable 64 is known in advance, by determining the vertical distance of the bottom surface Wb of the workpiece W from the lower surface of the worktable 64 on the basis of the upper surface 64a of the worktable 64 being used as the reference surface, and subtracting the thickness of the worktable 64 from the determined vertical distance, the vertical distance of the bottom surface Wb of the workpiece W from the reference surface S may be calculated.

Technical Ideas Obtained from the Embodiment

Technical ideas that can be grasped from the above embodiment will be described below.

A wire electrical discharge machine (10) that machines a workpiece (W) so as to have different machined shapes on a top surface (Wa) and a bottom surface (Wb) of the workpiece (W) includes: a distance measuring sensor (72) configured to move within a machining area (74) of the wire electrical discharge machine (10) and measure a distance from itself to an object to be measured; and a calculating unit (84) configured to set a reference surface (S) in the machining area (74), and calculate a distance between the reference surface (S) and the top surface (Wa) and a distance between the reference surface (S) and the bottom surface (Wb), from a distance between the reference surface (S) and the distance measuring sensor (72), measured by the distance measuring sensor (72), a distance between the top surface (Wa) and the distance measuring sensor (72), measured from above the workpiece (W) by the distance measuring sensor (72), and a distance between the bottom surface (Wb) and the distance measuring sensor (72), measured from below the workpiece (W) by the distance measuring sensor (72). This configuration makes it possible to determine the position of the top surface (Wa) and the position of the bottom surface (Wb) of the workpiece (W) simply with high accuracy.

In the above wire electrical discharge machine (10), the calculating unit (84) may be configured to calculate the thickness of the workpiece (W) from the distance between the reference surface (S) and the top surface (Wa) and the distance between the reference surface (S) and the bottom surface (Wb). Thus, it is possible to determine the thickness of the workpiece (W) accurately.

The above wire electrical discharge machine (10) may further include: a wire electrode (12) configured to perform electrical discharge machining on the workpiece (W); a wire electrode driving unit (30) configured to change the tilt of the wire electrode (12) with respect to the thickness direction of the workpiece (W) to be machined by the wire electrode (12); and a control unit (86) configured to control the wire electrode driving unit (30), and the control unit (86) may be configured to set the tilt of the wire electrode (12) depending on the distance between the reference surface (S) and the top surface (Wa) and the distance between the reference surface (S) and the bottom surface (Wb). As a result, the machining accuracy of the top surface (Wa) and the bottom surface (Wb) of the workpiece (W) can be improved.

The above wire electrical discharge machine (10) may further include a worktable (64) configured to hold the workpiece (W), and the reference surface (S) may be an upper surface (64a) or a lower surface of the worktable (64). By adopting the worktable (64), which has a good flatness, as the reference surface (S), the positions of the top surface (Wa) and the bottom surface (Wb) of the workpiece (W) with respect to the reference surface (S) can be determined with high accuracy.

The above wire electrical discharge machine (10) may further include a bottom side reference surface member (66) attached on the upper surface (64a) of the worktable (64) so as to protrude from the outer periphery of the worktable (64), and a portion of the bottom side reference surface member (66) that protrudes from the outer periphery of the worktable (64) may include a downward-facing plane (66a) that is flush with the upper surface (64a) of the worktable (64). This configuration makes it possible to measure the distance between the distance measuring sensor (72) and the reference surface (S) and the distance between the distance measuring sensor (72) and the bottom surface (Wb) of the workpiece (W), from the lower side of the workpiece (W), whereby the distance between the reference surface (S) and the bottom surface (Wb) of the workpiece (W) can be obtained with high accuracy.

In the above wire electrical discharge machine (10), the distance measuring sensor (72) may be configured to measure a vertical distance from itself to the object to be measured, and the calculating unit (84) may be configured to calculate a vertical distance between the reference surface (S) and the top surface (Wa) and a vertical distance between the reference surface (S) and the bottom surface (Wb), from the vertical distance between the reference surface (S) and the distance measuring sensor (72), the vertical distance between the top surface (Wa) and the distance measuring sensor (72), and the vertical distance between the bottom surface (Wb) and the distance measuring sensor (72), measured by the distance measuring sensor (72). Thereby, the position of the top surface (Wa) and the position of the bottom surface (Wb) of the workpiece (W) can be determined with high accuracy.

What is claimed is:

1. A wire electrical discharge machine configured to machine a workpiece so as to have different machined shapes on a top surface and a bottom surface of the workpiece, comprising:
    a distance measuring sensor configured to move within a machining area of the wire electrical discharge machine and measure a distance from the distance measuring sensor to an object to be measured; and
    a calculating unit configured to set a reference surface in the machining area, wherein the reference surface is an upper surface or a lower surface of the worktable, and calculate a distance between the reference surface and the top surface of a workpiece and a distance between the reference surface and the bottom surface of a workpiece by measuring, with the distance measuring sensor, a distance between the reference surface and the distance measuring sensor, measuring from above the workpiece, with the distance measuring sensor, a distance between the top surface of the workpiece and the distance measuring sensor, and measuring from below the workpiece, with the distance measuring sensor, a distance between the bottom surface of the workpiece and the distance measuring sensor, and subtracting the distance measured between the top surface or bottom surface of the workpiece and the distance measuring sensor from the distance measure between the reference surface and the distance measuring sensor.

2. The wire electrical discharge machine according to claim 1, wherein the calculating unit is configured to calculate a thickness of the workpiece from the distance between the reference surface and the top surface and the distance between the reference surface and the bottom surface.

3. The wire electrical discharge machine according to claim 1, further comprising:
    a wire electrode configured to perform electrical discharge machining on the workpiece;
    a wire electrode driving unit configured to change a tilt of the wire electrode with respect to a thickness direction of the workpiece to be machined by the wire electrode; and
    a control unit configured to control the wire electrode driving unit, wherein
    the control unit is configured to set the tilt of the wire electrode depending on the distance between the reference surface and the top surface and the distance between the reference surface and the bottom surface.

4. The wire electrical discharge machine according to claim 1, further comprising:
    a bottom side reference surface member attached on the upper surface of the worktable so as to protrude from an outer periphery of the worktable, wherein
    a portion of the bottom side reference surface member that protrudes from the outer periphery of the worktable includes a downward-facing plane that is flush with the upper surface of the worktable.

5. The wire electrical discharge machine according to claim 1, wherein:
    the distance measuring sensor is configured to measure a vertical distance from the distance measuring sensor to the object to be measured; and
    the calculating unit is configured to calculate a vertical distance between the reference surface and the top surface and a vertical distance between the reference surface and the bottom surface, from a vertical distance between the reference surface and the distance measuring sensor, a vertical distance between the top surface and the distance measuring sensor, and a vertical distance between the bottom surface and the distance measuring sensor, measured by the distance measuring sensor.

6. A control method for a wire electrical discharge machine configured to machine a workpiece so as to have different machined shapes on a top surface and a bottom surface of the workpiece, comprising:
    a distance measuring step of moving a distance measuring sensor within a machining area of the wire electrical discharge machine and measuring, with the distance measuring sensor, a distance from the distance measuring sensor to an object to be measured; and
    a calculating step of setting a reference surface in the machining area, wherein the reference surface is an upper surface of a lower surface of the worktable, and calculating a distance between the reference surface and the top surface of a workpiece and a distance between the reference surface and the bottom surface of the workpiece by measuring, with the distance measuring sensor, a distance between the reference surface and the distance measuring sensor, measuring from above the workpiece, with the distance measuring sensor, a distance between the top surface of the workpiece and the distance measuring sensor, and measuring from below the workpiece, with the distance measuring sensor, a distance between the bottom surface of the workpiece and the distance measuring sensor, and subtracting the distance measured between the top surface or bottom surface of the workpiece and the distance measuring sensor from the distance measure between the reference surface and the distance measuring sensor.

7. The control method for the wire electrical discharge machine according to claim 6, wherein the calculating step is effected to calculate a thickness of the workpiece from the distance between the reference surface and the top surface and the distance between the reference surface and the bottom surface.

8. The control method for the wire electrical discharge machine according to claim 6, wherein the wire electrical discharge machine includes:
    a wire electrode configured to perform electrical discharge machining on the workpiece;
    and a wire electrode driving unit configured to change a tilt of the wire electrode with respect to a thickness direction of the workpiece to be machined by the wire electrode,
    the control method further comprising a wire electrode drive control step of controlling the wire electrode driving unit so as to set the tilt of the wire electrode depending on the distance between the reference surface and the top surface and the distance between the reference surface and the bottom surface.

9. The control method for the wire electrical discharge machine according to claim 6, wherein the distance measuring step is effected to measure, with the distance measuring sensor, a vertical distance from the distance measuring sensor to the object to be measured; and the calculating step is effected to calculate a vertical distance between the reference surface and the top surface and a vertical distance between the reference surface and the bottom surface, from a vertical distance between the reference surface and the distance measuring sensor, a vertical distance between the top surface and the distance measuring sensor, and a vertical distance between the bottom surface and the distance measuring sensor, measured by the distance measuring sensor.

\* \* \* \* \*